March 19, 1963 S. A. MURDOCK ET AL 3,082,186
GRAFT COPOLYMERS OF AMINOETHYL-ACRYLATES AND METHACRYLATES
ON N-VINYL-3-MORPHOLINONE POLYMER SUBSTRATES, IMPROVED
ACRYLONITRILE POLYMER COMPOSITIONS OBTAINABLE
THEREWITH, AND METHOD OF PREPARATION
Filed Nov. 4, 1959

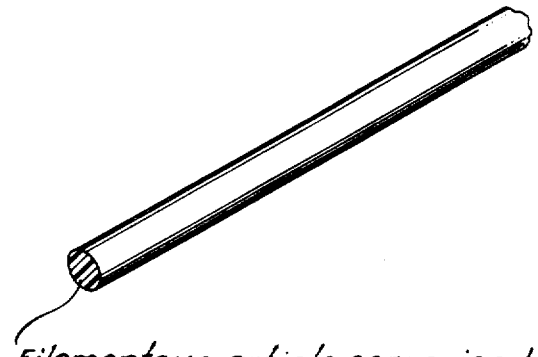

Filamentous article comprised of an acrylonitrile polymer having a graft copolymer of an aminoethylacrylate or methacrylate monomer graft copolymerized upon an N-vinyl-3-morpholinone polymer substrate incorporated therein.

INVENTORS.
Stanley A. Murdock
Clyde W. Davis
Forrest A. Ehlers
BY
THEIR ATTORNEY United States Patent Office 3,082,186
Patented Mar. 19, 1963

3,082,186
GRAFT COPOLYMERS OF AMINOETHYL-ACRYLATES AND METHACRYLATES ON N-VINYL-3-MORPHOLINONE POLYMER SUBSTRATES, IMPROVED ACRYLONITRILE POLYMER COMPOSITIONS OBTAINABLE THEREWITH, AND METHOD OF PREPARATION
Stanley A. Murdock, Concord, Calif., Clyde W. Davis, Williamsburg, Va., and Forrest A. Ehlers, Walnut Creek, Calif., assignors to The Dow Chemical Company, Midland, Mich., a corporation of Delaware
Filed Nov. 4, 1959, Ser. No. 850,936
15 Claims. (Cl. 260—45.5)

The present invention resides in the general field of organic chemistry and contributes specifically to the polymer art, especially with respect to graft copolymeric products particularly adapted for use in blend with fiber-forming polymers. The invention is thus pertinent to the man-made synthetic textile fiber industry.

It is particularly concerned with various graft copolymers of certain monomeric aminoethylacrylates or methacrylates on preformed substrate N-vinyl-3-morpholinone polymers (hereinafter referred to as VM polymers) that have especial utility as dye-receptive, antistatic and stabilizing ingredients for acrylonitrile polymer compositions which, advantageously, may be of the fiber-forming variety. The invention is also concerned with the compositions that may be obtained by blending the graft copolymeric products with acrylonitrile polymers, as well as the shaped articles which have been fabricated therefrom that have significantly enhanced properties and characteristics as regards improvements in and relating to enhanced dye-receptivity, minimized inherent propensity to accumulate electrostatic charges and an augmented natural stability to various deteriorating influences, including stability against becoming deleteriously influenced and degraded upon exposure to heat at elevated temperatures and light.

Within the scope and purview of the invention there is comprehended both the novel and utile graft copolymer and blended polymer compositions of the indicated varieties (as well as various shaped articles fabricated therefrom and comprised thereof) and advantageous methods for the preparation of the several types of compositions that are contemplated.

It is the main purpose and primary design of the present invention to provide and make available graft copolymeric products and blends of such products in acrylonitrile polymer compositions, each of which are of the above-indicated and hereinafter more fully delineated types, and shaped articles from the graft copolymer-containing acrylonitrile polymer compositions that have, as intrinsic and distinguishing characteristics, excellent receptivity of and acceptability for any of a wide variety of dyestuffs; permanently imbued antistatic properties that are unusually good for and not commonly encountered in polymeric materials of the synthetic, essentially hydrophobic varieties of such substances; and efficacious natural stability to heat and light as well as to certain chemical conditions such as alkaline environments.

The blended acrylonitrile polymer compositions of the present invention which fulfill such ends and offer corollary advantages and benefits, as will hereinafter be manifest, are, in essence, comprised of an intimate and practically inseparable blend or alloy constitution of (1) an acrylonitrile polymer that contains in the polymer molecule at least about 80 weight percent of polymerized acrylonitrile, any balance being polymerized units of another ethylenically unsaturated monomeric material that is copolymerizable with acrylonitrile, which acrylonitrile polymer is preferably of the fiber-forming variety (but which, as indicated, may suitably be a fiber-forming copolymer) and, most advantageously, is polyacrylonitrile and (2) a minor proportion of a beneficial graft copolymeric additament, also a product of the invention, that functions and serves simultaneously in the treble capacity of a dye-assisting adjuvant, permanent antistatic agent and stabilizer and which is comprised of the graft copolymerized polymerization product of (a) certain monomeric aminoethylacrylate or methacrylate compounds with and upon, as a trunk or preformed substrate in the graft copolymeric product, (b) a VM polymer, particularly poly-N-vinyl-3-morpholinone (hereinafter referred to as PVM).

The methods of the invention by which such compositions may be made involve graft copolymerizing the monomers on the preformed VM polymer substrate and incorporating the minor proportions of the resulting graft copolymeric product as an additament in and with the essential acrylonitrile polymer base by any of several beneficial techniques, hereinafter more thoroughly defined, adapted to suitably accomplish the desired result.

Without being limited to or by the specific embodiments and modes of operation set forth, the invention is exemplified in and by the following docent illustrations wherein, unless otherwise indicated, all parts and percentages are to be taken on a weight basis.

*Illustration A*

A polymeric additament satisfactory for use in practice of the present invention is prepared by charging into a suitable reaction vessel about 3.0 grams of the monomeric hydrochloride of 2 - aminoethylmethacrylate (AEMA·HCl); about 7.0 grams of PVM; about 0.2 gram of potassium persulfate; and about 40.6 grams of water. The relative viscosity of the PVM in water at 25° C. is about 1.85 at a concentration of 1 gram of the water-soluble polymer in 100 ml. of solution. The charge, after being mixed together, has a pH of about 6. The charge is polymerized under an atmosphere of nitrogen at a temperature of about 50° C., with continued agitation, for a period of about 16 hours. About 92 percent of the monomer is converted to a graft copolymer product with the PVM which contains about 28 percent of polymerized AEMA·HCl; and about 72 percent of PVM. The graft copolymerized polymeric additament is obtained from the reaction mass as a solution of the graft copolymer in water containing about 19.5 percent of dissolved polymer solids.

Polyacrylonitrile fibers containing about 10 percent of the above polymeric product are prepared by impregnating filamentary structures that are in aquagel condition after having been salt-spun and wet-stretched in and with an aqueous solution of the graft copolymer that contains about 5 percent of dissolved graft copolymer solids. The polyacrylonitrile aquagel fiber that is employed is obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contains about 42 percent of dissolved zinc chloride to form a multiple filament tow. After being spun, the tow bundle of coagulated polyacrylonitrile aquagel fiber is washed substantially free from salt upon being withdrawn from the coagulating bath and then wet-stretched for orientation to a total stretched length that is about thirteen times (13 ×) its original extruded length. The aquagel fiber is then passed through the mentioned aqueous impregnating bath of the dispersed polymeric additive so as to become impregnated therewith to the indicated extent.

Following the impregnation, the aquagel fiber is irreversibly dried at 150° C. to destroy the water-hydrated structure and convert it to a finished fiber form. The finally obtained 3 denier fiber product has a tenacity of about 4 grams per denier, an elongation of about 30 percent and a wet yield strength of about 0.8 gram per denier. The graft copolymer-containing acrylonitrile polymer fiber product is found to have excellent natural stability to heat and light as well as against becoming degraded under the influence of aqueous alkaline media at pH levels as high as 10. It is found to be nearly free of propensity to accumulate charges of static electricity upon handling.

The graft-copolymer-impregnated fiber product dyed well to deep and level shades of coloration with Calcodur Pink 2BL, a direct type of dyestuff (Colour Index Direct Red 75, formerly Colour Index 353).

The dyeing with Calcodur Pink 2BL is performed at the 4 percent level according to conventional procedure in which the fiber sample is maintained for about one hour at the boil in the dyebath which contains the dyestuff in an amount equal to about 4 percent of the weight of the fiber (OWF). The dyebath also contains sodium sulfate in an amount equal to about 15 percent of the weight of the fiber and has a bath-to-fiber weight ratio of about 30:1. After being dyed, the fiber is rinsed in water and dried for about 20 minutes at 80° C.

The dye-receptivity of the Calcodur Pink 2BL-dyed fiber is then evaluated spectrophotometrically by measuring the amount of monochromatic light having a wave length of about 520 millimicrons from a standard source that is reflected from the dyed sample. A numerical value on an arbitrarily designated scale from zero to one hundred is thereby obtained. This value represents the relative comparison of the amount of light that is reflected from a standard white tile reflector that has a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval.

The Calcodur Pink 2BL-dyed polyacrylonitrile fibers containing the above-described polymeric additament in accordance with the invention has a reflectance value of about 12. In contrast, ordinary unmodified polyacrylonitrile fibers of the same type generally have a reflectance value of about 130 on the same numerical scale.

When the graft copolymer-containing fiber is heated for 45 minutes at a temperature of about 150° C., it shows no evidence of discoloration. By way of comparison, an unmodified polyacrylonitrile fiber prepared in the same way develops a light yellow shade of coloration when subjected to the same thermal exposure.

In addition, the graft-copolymer-containing fiber sample, even after being severely scoured, has antistatic characteristics much superior to ordinary polyacrylonitrile fibers and only slightly poorer than cotton. At the same time, the physical properties of the graft-copolymer-containing fiber are excellent, being about equal to those of unmodified polyacrylonitrile fibers.

Equivalent results are obtained when the foregoing procedure is repeated excepting to impregnate the aquagel fiber with the copolymer additive prior to the stretch-drawing operation on the fiber.

*Illustration B*

Folowing the general procedure of Illustration A, about 3.0 grams of dimethylaminoethylacrylate (DMAEA); about 7.0 grams of PVM having a Fikentscher K-value of about 30; about 0.2 gram of ammonium persulfate and about 40.6 grams of water are mixed together and the pH of the resulting mixture adjusted with HCl to a value of about 5. The charge is polymerized for about 16 hours at 50° C. under a nitrogen atmosphere with continued agitation throughout the entire period of polymerization. Practically all of the monomer is converted to a water-insoluble graft copolymer product which is obtained in the form of a uniform, milky, aqueous dispersion. The graft copolymer product contains about 29 percent of the polymerized DMAEA and about 71 percent of the PVM. The dispersion is applied to a polyacrylonitrile aquagel fiber by a method in accordance with that set forth in the first illustration using a 5 percent aqueous dispersion of the graftcopolymer as an impregnating bath. The impregnated fiber is found to contain about 12 percent of the graft-copolymer product. The impregnated fiber product is readily dyeable. Its Calcodur Pink 2BL reflectance value is 9. It has low static properties and excellent stability to heat, light and alkaline media at pH levels as high as 10.

*Illustration C*

The procedure of Illustration B is essentially duplicated excepting to employ a graft copolymeric polymer additament which is a graft copolymer of diethylaminoethylacrylate (DEAEA) on PVM prepared from the following polymerization mass which is polymerized under the same conditions and in the same way as that of the preceding example:

|  | Grams |
|---|---|
| DEAEA | 3.0 |
| PVM (Fikentscher K-value 50) | 7.0 |
| Potassium persulfate | 0.2 |
| Water | 40.6 |

The pH is adjusted to 4 with HCl and then polymerized at 50° C. for 16 hours. Conversion of the monomer to graft-copolymer product is about 88 percent. The graft copolymer is obtained as a slightly colored aqueous solution containing about 20 percent of polymeric solids.

Polyacrylonitrile aquagel fibers are impregnated in the same way as set forth in the preceding illustrations from a 3 percent aqueous solution of the graft-copolymer product so as to contain, upon being dried and converted to finished fiber form, about 10 percent of the impregnated graft copolymer OWF. The resulting graft copolymer-containing fiber product is readily dyeable. Its Calcodur Pink 2BL reflectance value is about 12. Its heat stability is excellent. After 20 minutes of exposure at 150° C., the graft copolymer-containing fiber product develops a hardly discernible discoloration. In contrast, a similarly prepared (but completely unmodified) polyacrylonitrile fiber turns to a quite noticeable shade of yellow coloration under the same thermal test. Furthermore, even after being severely scoured, the graft copolymer-containing fiber sample has electrical conductance properties much superior to ordinary polyacrylonitrile fibers and only slightly poorer than cotton. At the same time, the physical properties of the graft copolymer-containing fibers are excellent, being about equal to those of the unmodified polyacrylonitrile fiber.

*Illustration D*

About 3.0 grams of dimethylaminoethylmethacrylate; 7.0 grams of PVM having a Fikentscher K-value of about 57; 40.6 grams of water and 0.2 gram of potassium persulfate are mixed together. The pH of the resulting mixture is adjusted with HCl to 5. The thereby-obtained polymerization mass is heated under a nitrogen atmosphere, with continued agitation, for a period of about 16 hours at a temperature of about 50° C. During this time, conversion of the monomers to graft copolymer product is substantially complete.

A water-soluble graft-copolymer product is thereby obtained which is found to contain about 28 percent of the polymerized dimethylaminoethylmethacrylate and about 72 percent of PVM. The aqueous product contains about 20 percent of graft copolymeric solids. When the graft copolymeric polymer additament is impregnated from a 3 percent aqueous dispersion into polyacrylonitrile aquagel fibers (according to the foregoing procedures) so as to obtain a fiber product with an impregnated graft-copolymer content of about 12 percent, a readily dyeable fiber is obtained. This fiber product, when dyed with 4 percent Calcodur Pink 2BL, is found to have a reflectance value of about 11. The antistatic characteristics of the graft copolymer-containing fiber product are about commensurate with those of cotton. The resulting fiber product also has excellent heat, light and alkaline stability. To illustrate, upon 20 minutes exposure at 150° C., only slight discoloration occurs in the fiber product. Besides, its physical properties are very good, being comparable to those of unmodified polyacrylonitrile fibers of the same type.

*Illustration E*

Following the procedure of Illustration B, an excellent graft copolymeric additament is prepared from the following charge:

|  | Grams |
|---|---|
| AEMA-HCl | 6.0 |
| PVM (same as in Illustration A) | 6.0 |
| Water | 50.3 |
| Potassium persulfate | 0.12 |
| pH of reaction mass | 4.5 |

The product is a high viscosity, clear, colorless solution. Conversion is 92 percent.

Results similar to those above can be achieved with other graft copolymers within the scope of the invention, preparing them from other monomers of the subsequent Formula I upon PVM or other N-vinyl-3-morpholinone polymer substrates, such as copolymers of VM with N-vinyl-2-pyrrolidone; N-vinyl-5-methyl-2-pyrrolidone; N-vinyl-piperidone; and other N-vinyl lactam monomers; N-vinyl-2-oxazolidinone; N-vinyl-5-methyl-2-oxazolidinone; N-vinyl-5-ethyl-2-oxazolidinone; N-vinyl-2-oxazinidinone; and other N-vinyl cyclic carbamate monomers; and so forth within the compositional ranges detailed below.

Results similar to those set forth in the foregoing can also be obtained when the polymeric additaments are incorporated in polyacrylonitrile and other acrylonitrile polymer fibers that contain in the polymer molecule at least about 80 weight percent of acrylonitrile to provide articles in accordance with the present invention by blending or mixing together the polymeric additament and the fiber-forming acrylonitrile polymer in a spinning composition or dope prior to its extrusion and to filamentary products by either wet-spinning or dry-spinning techniques. In such instances, incidentally, it may be desirable in order to secure optimum benefit in the practice of the invention to employ relatively larger quantities of the copolymeric additament than when surface impregnation is performed so that the presence of effective quantities of the additament at or near the surface of the article is assured.

The polymeric additaments that are employed in the practice of the invention, as is indicated in the foregoing, are graft copolymerized products upon (b) VM polymer substrates of (a) monomeric aminoethylacrylates and methacrylates of the general formula and structure:

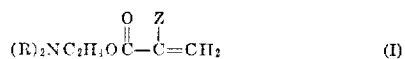

wherein each R is independently selected from the group consisting of hydrogen, methyl radicals and ethyl radicals and Z is hydrogen or methyl. Included among the several aminoethylacrylate monomers that may be employed suitably are the following: 2-aminoethylacrylate; 2-aminoethylmethacrylate; methyl-2-aminoethylacrylate; methyl-2-aminoethylmethacrylate; dimethyl-2-aminoethylacrylate; dimethyl-2-aminoethylmethacrylate; ethyl-2-aminoethylacrylate; ethyl-2-aminoethylmethacrylate; diethyl-2-aminoethylacrylate; diethyl-2-aminoethylmethacrylate; methyl ethyl-2-aminoethylacrylate; and methyl ethyl-2-aminoethylmethacrylate. As is appreciated by those skilled in the art, the acrylate monomers, as well as copolymers formed therefrom, are normally present as acid salts in solutions or other dispersions in which the pH is about 6 or less. Thus, hydrochloride salts are present in hydrochloric acid solutions or in dispersions of the acrylate monomers or their polymeric products in hydrochloric acid. These acid salts are freely and reversibly formed and dissociated, depending upon the medium in which the acrylate exists. The dissociated forms of such salts should not be considered as entities that are unique from their corresponding undissociated forms.

The N-vinyl-3-morpholinone polymers that are utilized as preformed substrates in the preparation of the graft copolymeric additaments of the present invention have, as an essential constituent of their polymeric structure, characterizing proportions of the recurring group:

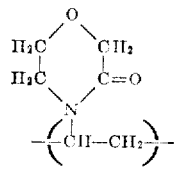

As has been indicated, copolymers of N-vinyl-3-morpholinone may also be employed. Thus, copolymers of N-vinyl-3-morpholinone with various homologous alkyl ring-substituted N-vinyl-3-morpholinone monomers may be utilized, such as copolymers of N-vinyl-3-morpholinone with N-vinyl-5-methyl-3-morpholinone, N-vinyl-5-ethyl-3-morpholinone, and the like. Copolymers of N-vinyl-3-morpholinone with various N-vinyl lactam polymers, such as N-vinyl-pyrrolidone, N-vinyl-piperidone, N-vinyl caprolactam, N-vinyl-5-methyl-2-pyrrolidone and the like may also be prepared. Advantages are also achieved with copolymers of N-vinyl-3-morpholinone and various of the N-vinyl-2-oxazolidinone monomers, such as N-vinyl-2-oxazolidinone, N-vinyl-5-methyl-2-oxazolidinone, N-vinyl-5-ethyl-2-oxazolidinone, N-vinyl-2-oxazinidinone, and so forth.

These N-vinyl-3-morpholinone polymers and their preparation are discussed in U.S. Patents 2,952,668, filed April 16, 1958; 2,946,772, filed February 27, 1958; and 2,948,708, filed April 3, 1958; and in the copending application for U.S. patent having Serial No. 692,587, filed October 28, 1957, now U.S. 2,987,509, and entitled "N-Vinyl-3-Morpholinone Compounds."

Advantageously, the N-vinyl-3-morpholinone polymer that is used in the manufacture of the graft copolymer product has a Fikentscher K-value between about 5–10 and about 100 and, more advantageously, between about 20–30 and 60.

Beneficially, as mentioned, the N-vinyl-3-morpholinone polymer that is utilized is a water-soluble material. In cases where N-vinyl-3-morpholinone copolymers are employed that tend to water-insolubility with decreasing portions of N-vinyl-3-morpholinone in the copolymer molecule (as is the case with copolymers of N-vinyl-3-morpholinone and N-vinyl-5-methyl-2-oxazolidinone), it is generally most desirable for the copolymer to contain at least about 40 weight percent of the N-vinyl-3-morpholinone polymerized therein. This avoids working with a product that may have a cloud (or precipitation) point in water or other aqueous solution beneath the boil.

The graft copolymeric additaments that are employed in the practice of the invention may generally be prepared by various methods of polymerization, including those which have been demonstrated in the foregoing illustrative examples. The graft copolymer products may be either water-soluble or water-insoluble, depending upon their specific compositions. In either event, the graft copolymers are readily dispersible in aqueous and other liquid media. In addition to the usual catalysts, including persulfates, organic and inorganic peroxides and azo type catalysts, the graft-copolymers may oftentimes be polymerized under the influence of high energy radiation such as by means of X-rays and the like, or simply by heating and evaporating the monomer-containing polymerization mixture. The graft-copolymers may be prepared in both aqueous and organic solvent vehicles, using temperatures for the desired polymerization that may vary from about room temperature to the boiling point of the polymerization mixture. It is ordinarily satisfactory to conduct the reaction at a temperature of about 50 to 80 or 100° C. Usually, depending upon the specific factors that may be involved, the copolymerization may be accomplished satisfactorily within a time period of about 10 to 60 hours.

The compositions of the graft copolymerized polymeric additament can vary within rather wide limits. Advantageously, the content of the preformed VM polymer substrate upon or with which the monomeric aminoacrylates are graft copolymerized is between about 20 and 80 percent of the weight of the graft copolymerized product. It may frequently be desirable for the monomeric constituent that is polymerized to be employed in nearly equivalent or about commensurate or equal weight proportions with the preformed VM polymer trunk in the preparation of the graft copolymeric polymeric additament.

The polymerization system that is employed for the preparation of the copolymers employed in the present invention may consist of as much as 50 percent by weight of the monomer and preformed polymer substrate to be graft-copolymerized in the aqueous medium. The amount of monomeric material that is provided in the copolymerization system may be influenced somewhat by the manner in which it is intended to incorporate the product in the synthetic polymer compositions in order to provide the compositions of the invention.

If, for example, it is intended to incorporate the graft copolymer products by blending into a fiber-forming composition prior to its fabrication into shaped articles, the copolymerization system may, if desired, contain about equal proportions by weight of the charged monomeric and polymeric materials and the polymerization medium which preferably is miscible with and tolerable in the spinning solution solvent being used. In such cases, the graft copolymer product may ordinarily be obtained as a soluble product or as an easily dispersed gel that, after being dried and isolated from unreacted monomer, may readily be directly incorporated in the fiber-forming composition.

In the incorporation of the graft copolymeric additament in a fiber-forming composition is to be achieved by impregnation therewith of an already-formed shaped article of the composition, it may be desirable to effect the polymerization so as to directly form the polymerization system as a suitable applicating solution or as an emulsion or suspension of the copolymeric product. For such purposes, the polymerization system may be prepared to contain as little as 2 or 10 percent by weight of the graft copolymerizing ingredients. Preferably, if a water-insoluble graft copolymer is being made, such a polymerization may be conducted under the influence of vigorous agitation to facilitate preparation of an emulsified or thoroughly dispersed product. It may also be beneficial under such circumstances to incorporate a dispersant or emulsifying agent in the polymerization system to facilitate obtaining a stable and homogenous emulsified product. Such a method for preparing the graft copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the graft copolymeric additaments, in either solution or dispersion form, may be impregnated into the fiber while it is in a swollen or gel condition, as an acrylonitrile polymer fiber in an aquagel condition, in order to obtain the desired graft copolymer-containing product.

In this connection, when it is desired to blend the polymeric additament in a synthetic polymer fiber-forming solution prior to its extrusion, such as an aqueous saline acrylonitrile polymer solution, the graft copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous under such circumstances to comminute the polymeric additament in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution.

Thus, if the aqueous saline polyacrylonitrile solvent that is being employed is an aqueous solution of zinc chloride or its equivalent that contains at least about 55 percent and preferably about 60 percent by weight of dissolved zinc chloride, it may be advantageous to comminute a water-insoluble graft copolymeric additament while it is in a mixture with the saline solvent solution that contains between about 5 and 10 percent by weight of the copolymer. Analogous procedures may be employed when other solvents are involved. Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of a water-insoluble graft copolymeric additament in the acrylonitrile polymer solvent that is suitable for blending in the spinning solution of the acrylonitrile polymer to provide a spinnable composition may usually be obtained by milling the mixture of polymeric additament and solvent for an extended period that may exceed 100 hours. The suspension that is thereby obtained may then be directly blended in the proper proportions with the acrylonitrile polymer spinning solution to provide a composition in accordance with the present invention. Of course, water-soluble graft copolymeric additaments are generally capable of being directly dissolved in such aqueous saline solvents.

If desired, the graft copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the polymeric additament are incorporated therein. An appreciable improvement in dye-receptivity, antistatic properties and stability may frequently be obtained when a quantity of the graft copolymeric additament that is less than 1 percent by weight is employed. Advantageously, an amount between about 4 and 15 percent by weight of the graft copolymeric additament may thus be utilized in the composition. Greater advantages may often accrue when the amount of the polymeric additament that is incorporated in the composition is in the neighborhood of 5-10 percent by weight, based on the weight of the composition.

As has been indicated, the graft copolymeric additaments may be incorporated in the acrylonitrile polymer compositions according to various techniques. Thus, for example, the polymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dissolving or dispersing them in a suitable liquid medium. Or, the compositions may be provided in fiber-forming system by sequentially dissolving or dispersing the polymers in any desired order in a suitable medium, as by incorporating the polymeric additament in a prepared acrylonitrile polymer spinning solution, dope or the like. As is obvious, the polymeric additaments employed in the practice of the present invention are readily soluble or dispersible in most solvents.

As is evident from the illustrative examples heretofore included, a highly advantageous technique for providing the compositions, particularly when acrylonitrile polymer fiber products are involved, is to apply or impregnate the graft copolymeric additament from an aqueous solution or dispersion thereof to a shaped acrylonitrile polymer article that is in an aquagel condition in a known manner. Thus, an acrylonitrile polymer filamentary article that has been spun from an aqueous saline spinning solution may be conveniently passed, after its coagulation and while it is in an aquagel condition, through a water bath containing a dissolved or dispersed graft copolymeric additament in order to impregnate the filament with the graft-copolymer and provide a composition and an article in accordance with the invention. In addition, the graft copolymeric additaments may be provided by in situ polymerization of the graft copolymerizing constituents in a shaped article of the acrylonitrile polymer base. Accordingly, the acrylnoitrile polymer, such as polyacrylonitrile aquagel, may be impregnated with suitable proportions of the vinyl lactam polymer and the aminoacrylate monomer and the graft copolymer formed in situ by accomplishing the graft copolymerization with impregnated chemical catalysts using dry or steam heat or with high energy radiation.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable to particular instances.

The acrylonitrile polymer fiber products in accordance with the present invention (one of which is schematically illustrated in the sole FIGURE of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct naphthol and sulfur dyes.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1 also known as Amacel Scarlet BS, and having American prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing acrylonitrile polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1), and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue 400 percent (Colour Index Dispersed Blue 1) and Acetamine Yellow N (Colour Index Dispersed Yellow 32); B-Naphthol 2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness and retain the dye-assisting polymeric additament in a substantially permanent manner despite repeated exposure and subjection to washing, laundering and dry cleaning treatments.

What is claimed is:

1. Graft copolymer of between about 20 and about 80 weight percent of (a) a monomeric aminoethylacrylate compound of the formula:

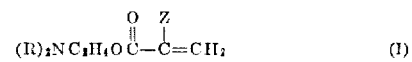   (1)

wherein each R is independently selected from the group consisting of hydrogen methyl and ethyl and Z is selected from the group consisting of hydrogen and methyl; and (b) from about 80 to about 20 weight percent of a polymerized monoethylenically unsaturated monomeric material containing at least about 10 weight percent of N-vinyl-3-morpholinone and up to about 90 weight percent of another N-vinyl heterocyclic compound copolymerizable with N-vinyl-3-morpholinone.

2. The graft copolymer of claim 1, containing in the polymer molecule between about 30 and about 80 weight percent of said monomeric acrylate compound.

3. The graft copolymer of claim 11, wherein said polymerized monoethylenically unsaturated monomeric material is poly-N-vinyl-3-morpholinone.

4. Method for the preparation of a graft copolymer which comprises polymerizing between about 20 and about 80 weight percent, based on resulting graft copolymer weight, of a monomeric acrylate compound of the formula:

$$(R)_2NC_2H_4OC(=O)-C(Z)=CH_2 \qquad (I)$$

wherein each R is independently selected from the group consisting of hydrogen, methyl and ethyl and Z is selected from the group consisting of hydrogen and methyl; with between about 80 and about 20 weight percent of a polymerized monoethylenically unsaturated monomeric material containing at least about 10 weight percent of N-vinyl-3-morpholinone and up to about 90 weight percent of another N-vinyl heterocyclic compound, copolymerizable with N-vinyl-3-morpholinone.

5. Composition comprising between about 99.5 and about 80 weight percent, based on composition weight, of (A) a polymerized ethylenically unsaturated monomeric material containing at least about 80 weight percent of acrylonitrile, and (B) between about 0.5 and about 20 weight percent, based on the composition weight, of a graft copolymer of (a) from about 20 to about 80 weight percent of a monomeric acrylate compound of the formula:

$$(R)_2NC_2H_4OC(=O)-C(Z)=CH_2 \qquad (I)$$

wherein each R is independently selected from the group consisting of hydrogen, methyl and ethyl and Z is selected from the group consisting of hydrogen and methyl; and (b) between about 80 and 20 weight percent of a polymerized monoethylenically unsaturated monomeric material containing at least about 10 weight percent of N-vinyl-3-morpholinone and up to about 90 weight percent of another N-vinyl heterocyclic compound copolymerizable with N-vinyl-3-morpholinone.

6. The composition of claim 5 containing between about 5 and about 10 weight percent, based on composition weight, of said graft copolymer.

7. The composition of claim 5, wherein said graft copolymer contains 50 weight percent of said monomeric acrylate compound.

8. The composition of claim 5, wherein the graft copolymer is 2-aminoethylmethacrylate and poly-N-vinyl-3-morpholinone.

9. The composition of claim 5, wherein the graft copolymer is dimethylaminoethylacrylate and poly-N-vinyl-3-morpholinone.

10. The composition of claim 5, wherein the graft copolymer is dimethylaminoethylmethacrylate and poly-N-vinyl-3-morpholinone.

11. The composition of claim 5, wherein the acrylonitrile polymer is polyacrylonitrile.

12. The composition of claim 5 dispersed in a solvent for polyacrylonitrile.

13. A filamentary shaped article comprised of the composition of claim 5.

14. Method for the preparation of a dye-receptive, antistatic, synthetic, linear hydrophobic polymer composition which comprises immersing an aquagel structure of a polymerized ethylenically unsaturated monomeric material containing at least about 80 weight percent of acrylonitrile in an aqueous dispersion of a graft copolymer of (a) from about 20 to about 80 weight percent of a monomeric acrylate compound of the formula:

$$(R)_2NC_2H_4OC(=O)-C(Z)=CH_2 \qquad (I)$$

wherein each R is independently selected from the group consisting of hydrogen, methyl and ethyl and Z is selected from the group consisting of hydrogen and methyl; and (b) between about 80 and about 20 weight percent of a monoethylenically unsaturated monomeric material containing at least about 10 weight percent of N-vinyl-3-morpholinone and up to about 90 weight percent of another N-vinyl heterocyclic compound copolymerizable with N-vinyl-3-morpholinone until between about 1 and about 20 weight percent of said graft copolymer, based on resulting composition weight on a dry weight basis, is impregnated in said aquagel; and irreversibly drying said graft copolymer-containing aquagel to convert it from the aquagel condition to a finished shaped article form.

15. The method of claim 14, wherein said acrylonitrile polymer is polyacrylonitrile.

References Cited in the file of this patent
UNITED STATES PATENTS

| | | |
|---|---|---|
| 2,558,734 | Cresswell | July 3, 1951 |
| 2,861,101 | Tousignant et al. | Nov. 18, 1958 |

UNITED STATES PATENT OFFICE
CERTIFICATE OF CORRECTION

Patent No. 3,082,186                      March 19, 1963

Stanley A. Murdock et al.

It is hereby certified that error appears in the above numbered patent requiring correction and that the said Letters Patent should read as corrected below.

Column 4, line 34, for "4" read -- 5 --.

Signed and sealed this 12th day of November 1963.

(SEAL)
Attest:
ERNEST W. SWIDER                      EDWIN L. REYNOLDS

Attesting Officer                   Acting Commissioner of Patents

UNITED STATES PATENT OFFICE
CERTIFICATE OF CORRECTION

Patent No. 3,082,186

March 19, 1963

Stanley A. Murdock et al.

It is hereby certified that error appears in the above numbered patent requiring correction and that the said Letters Patent should read as corrected below.

Column 4, line 34, for "4" read -- 5 --.

Signed and sealed this 12th day of November 1963.

(SEAL)
Attest:

ERNEST W. SWIDER

Attesting Officer

EDWIN L. REYNOLDS

Acting Commissioner of Patents